Mar. 13, 1923.

L. A. LEVY ET AL

X-RAY PLATE

Filed Feb. 2, 1921

1,448,456

Inventors

Patented Mar. 13, 1923.

1,448,456

UNITED STATES PATENT OFFICE.

LEONARD ANGELO LEVY AND ABRAHAM LIONEL LANDAU, OF LONDON, ENGLAND.

X-RAY PLATE.

Application filed February 2, 1921. Serial No. 441,813.

*To all whom it may concern:*

Be it known that we, LEONARD ANGELO LEVY and ABRAHAM LIONEL LANDAU, both subjects of the King of Great Britain, respectively, residing at 31 Shoot-up Hill Road, Cricklewood, London, England, and 24 Leigh Road, Highbury Barn, London, England, have invented new and useful Improvements in X-Ray Plates, of which the following is a specification.

Our invention relates to improvements in X-ray plates.

As is well-known the effect of X-rays upon photographic light sensitive emulsions is considerably less than that of visible and short wave length light rays, into which the energy of the X-rays can be converted, and for this reason use is made in radiography of intensifying screens coated with a fluorescent material which transforms the energy of the incident X-rays into that of visible and ultra violet light rays and thereby considerably reduces the length of exposure required to obtain any given effect upon a sensitive plate or film.

In ordinary practice such intensifying screens are entirely separate from the photographic or sensitive plates or films in conjunction with which they are used. The suggestion has been made that the screen and the plate might be combined by directly coating an intensifying layer upon an ordinary dry plate, but it has been stated that this was impossible to apply practically. It has also been proposed to apply a coating of sensitive emulsion upon a layer of calcium tungstate in gelatine or other suitable medium coated upon a paper support. The plates, referred to, although they possess the advantage that they provide true optical contact between screen and emulsion, are not capable of general practical application. Furthermore, in the case of the paper backing, true optical contact between the fluorescent salt and the emulsion is not obtained.

Now, our invention has for its object to provide an improved form of combined photographic plate or film and intensifying screen, which, whilst retaining true optical contact between screen and sensitive emulsion, is capable of general use and is of relatively low cost. To this end according to our invention we coat the sensitive film of the plate or film with a thin layer of fluorescent or intensifying material which can subsequently, after the exposure of the plate, be removed or separated from the said plate.

In the accompanying drawing:—

Figure 1:
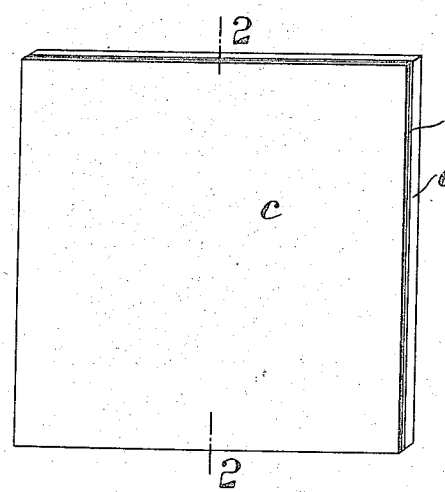
Figure 1 is a perspective view of an X-ray plate in accordance with the invention and Figure 2 is a section on the line 2—2, Figure 1.
Figure 2:
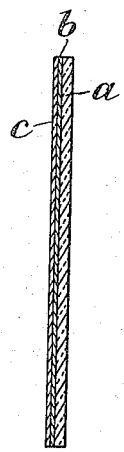

Referring to Figures 1 and 2, *a* is the plate, *b* the sensitive film thereon and *c* the thin layer of fluorescent or intensifying material on the film *c*.

In a suitable way of carrying out the invention, the intensifying layer *c* is dissolved off the plate or film, after exposure, by a solvent which has no injurious effect upon the gelatine or other emulsion upon the plate. A plate embodying this principle may be composed, for example, as follows. The glass or celluloid backing or other support *a* is coated with an emulsion hardened in the known manner, as, for example, with chrome alum. The emulsion is then coated with a layer of calcium tungstate in a medium composed of gelatine having a low temperature of solution in water. Such a plate, after exposure, is immersed for a few minutes in tepid water which dissolves off the tungstate film without affecting the hardened emulsion.

Figure 3:
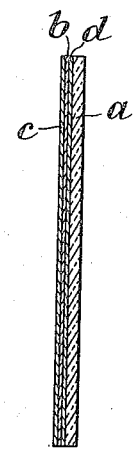
Figure 3 is a view similar to Figure 2 illustrating a modification.

It will be understood, however, that calcium tungstate is referred to as a suitable fluorescent material by way of example only as any other substance capable of producing the same result may be used. Also, although the medium with which the fluorescent substance is incorporated may be one which, as in the particular example above described, is soluble in water, it will be understood, that any other medium may be made use of which is soluble in any other substance which has no injurious effect upon the emulsion.

Where it is desired still further to increase the speed of exposure an additional fluorescent or intensifying coating *d*, Fig. 3, may be interposed between the plate or film *a* used as a backing and the sensitive emulsion *b*.

Instead of employing an ordinary photographic emulsion, we may prefer to employ an emulsion specially sensitized (in the manner well known) to the wave lengths of the fluorescent light emitted, thereby further increasing the density of the deposit with a given exposure.

By our invention it is found possible, in view of the good optical contact which is obtained between the sensitive film and the fluorescent layer, to materially reduce the quantity of fluorescent salt required to be used, thus considerably lessening the cost of production.

Our invention is applicable, as will be understood, to films or plates, coated with light sensitive emulsion on both sides, and also to plates or films suitable for use with rays derived from radioactive substances.

Claims:

1. An X-ray plate comprising a dry plate, the sensitive emulsion of which is coated with an intensifying layer capable of being separated from the plate after exposure of the latter.

2. An X-ray plate as claimed in claim 1, wherein the intensifying layer is capable of being dissolved off the sensitive emulsion, after exposure, by a solvent having no injurious effect upon the latter.

3. An X-ray plate as claimed in claim 1 wherein the intensifying layer is capable of being dissolved off the sensitive emulsion, after exposure, by a solvent having no injurious effect upon the latter, said intensifying layer being composed of calcium tungstate in a gelatine medium which can be dissolved off by immersing the plate, after exposure, in tepid water, the emulsion of the plate being prepared with hardened gelatine.

4. An X-ray plate as claimed in claim 1, having an additional intensifying layer interposed between the plate and the sensitive emulsion.

LEONARD ANGELO LEVY.
ABRAHAM LIONEL LANDAU.